March 23, 1926.  1,578,003
E. H. BRIDGE
HANDLE FOR BATTERY BOXES
Filed Oct. 7, 1925   2 Sheets-Sheet 1

INVENTOR.
ELLIS H. BRIDGE.
BY
ATTORNEY

March 23, 1926.  1,578,003
E. H. BRIDGE
HANDLE FOR BATTERY BOXES
Filed Oct. 7, 1925  2 Sheets-Sheet 2

INVENTOR.
ELLIS H. BRIDGE.
BY
ATTORNEY.

Patented Mar. 23, 1926.

1,578,003

UNITED STATES PATENT OFFICE.

ELLIS H. BRIDGE, OF AKRON, OHIO, ASSIGNOR, BY DIRECT AND MESNE ASSIGNMENTS, TO THE ELECTRIC STORAGE BATTERY COMPANY, OF PHILADELPHIA, PENNSYLVANIA, A CORPORATION OF NEW JERSEY.

HANDLE FOR BATTERY BOXES.

Application filed October 7, 1925. Serial No. 60,994.

*To all whom it may concern:*

Be it known that I, ELLIS H. BRIDGE, a citizen of the United States, and a resident of Akron, county of Summit, and State of Ohio, have invented certain new and useful Improvements in Handles for Battery Boxes, of which the following is a specification.

The chief object of the invention is to provide an effective but simple and inexpensive handle capable of being readily attached to and removed from the box without the use of bolts, nuts, screws or rivets or without being molded into the vulcanized rubber thereof.

In handles heretofore employed, various of the means outlined above have been utilized in securing the same to the box. It has been found that the fastening devices used become so corroded that the handle is removed only with great difficulty and neither the fastening devices nor the handle can be reused. Even the type of handle consisting of metal embedded in rubber has been found to corrode and replacement of such handles is, of course, impossible. Furthermore, the handles previously employed, especially molded-in handles, are so rigidly secured to the box that strains set up about the handle when secured in an automobile by the usual clamping devices on the battery container in the car, due to the clamping action thereon, cause cracking of the sealing compound, thereby releasing acid from the containers.

A particular object of the invention is to provide a handle having a transverse sliding force fit on a dovetail portion on the box whereby the use of a flexible tongue as disclosed in the prior application may be obviated and yet all of the advantages of said prior handle construction, such as resistance to corrosion, ease of replacement and the like, will be retained, and, in addition, a more rigid attachment of the handle to the box will result.

A particular object of the invention is to provide a handle of a single sheet metal stamping, capable of being easily mounted on or removed from the box.

The foregoing and other objects are obtained by the construction illustrated in the accompanying drawings and described in detail below. It is to be understood that the invention is not limited to the specific form thereof shown and described.

This application is a continuation, in part, of a co-pending application Serial Number 43,075, filed July 13, 1925.

Figure 1:
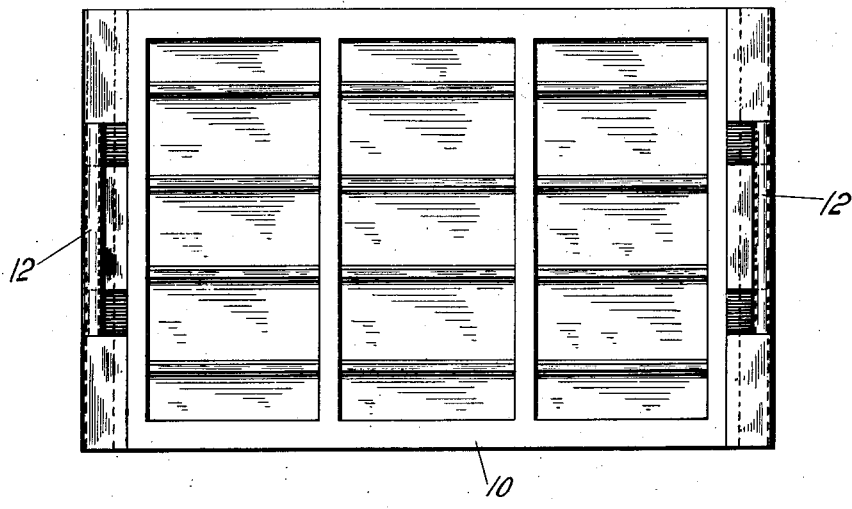
Figure 1 is a plan view of a battery box handle embodying the invention mounted thereon.
Figure 2:
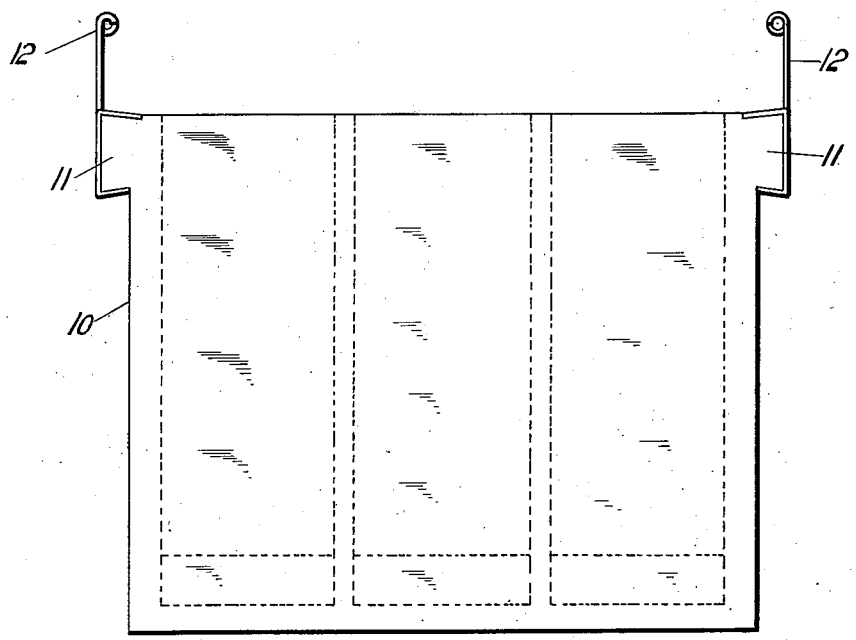
Figure 2 is a side elevation thereof.
Figure 3:
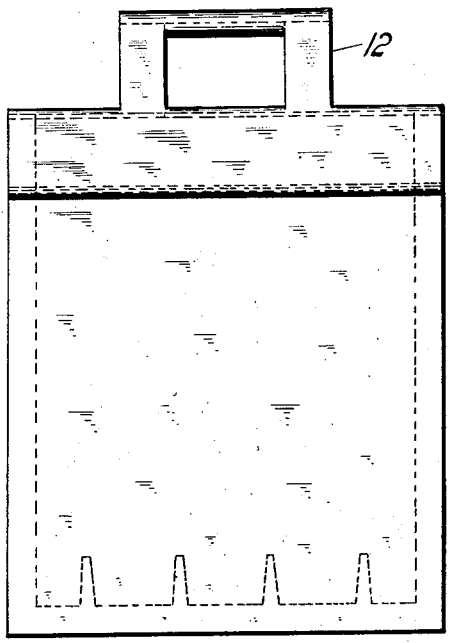
Figure 3 is an end elevation thereof.

Referring to the drawings, 10 represents a battery box of rubber or other material formed with dovetail ribs 11, 11 extending across the ends thereof adjacent its upper edges, whereby the box is adapted to receive the handle of the invention.

Figure 4:
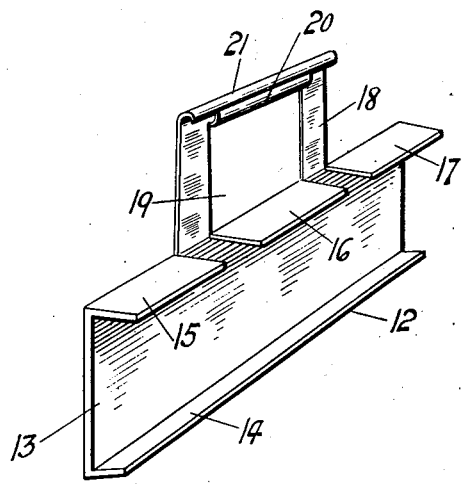
Figure 4 is a perspective view of the handle.

The handles are indicated generally at 12, 12 and, as shown in Figure 4, are formed from a single stamping from sheet metal including a dovetail channel member 13 having a continuous lower flange 14 and an upper series of aligned flanges 15, 16 and 17 of somewhat greater width than the lower flange to provide increased purchase thereof on the upper side of a rib 11 to prevent rocking of the handles off the ribs 11 by action of the usual securing devices thereon when the box is in place in a vehicle.

The handle proper, indicated by numeral 18, is defined by an upwardly projecting rectangle of sheet metal into which an opening 19 has been punched, part of the metal from the opening being bent over to provide flange 16, and another part being rolled upwardly as at 20 into engagement with a downwardly rolled upper edge 21 to provide a suitable gripping portion on the handle. The construction provides a considerable degree of flexibility in the handle portion 18 which is of advantage in absorbing strains which otherwise might affect the box, break the sealing compound, etc.

The flanges 14, 15, 16 and 17 are so bent as to force-fit onto a rib 11, the handle being applied by transversely aligning the channel 13 with a rib 11 and tapping the outer end of the channel to force it transversely onto the rib. Removal of the handle is accomplished by tapping the handle proper 18 so as to slide it transversely off of the rib. It is to be noted that at least one end of the channel 13 and at least one end of the rib 11 must be unobstructed in order to permit a sliding force-fit of one in the other.

It will appear from the foregoing that an exceedingly simple but effective handle has been provided for use on battery boxes. It is easily applied to the box by a tapping action on the end of the channel and is just as easily removed for replacement or other purposes by a tapping action on the handle proper, but yet is very rigidly secured to the box in a manner so as to be capable of supporting the weight of the battery and withstanding the customary handling of the box occasioned by recharging and repairing, etc. It will be understood that the handle is lead-coated, painted or otherwise treated to prevent corrosion.

Modifications of the invention may be resorted to without departing from the spirit thereof or the scope of the appended claims. The term "sliding force fit" as used in the claims means fitted in such a way that the handle may be applied or removed by a driving blow, as by means of a hammer, and is intended to distinguish from securing a handle on a portion of the box by snapping a portion of the handle over a projection or into an undercut portion on the box. The term "dovetail" as used in the claims is intended to cover all undercut formations either on the handle or on the box.

What is claimed is:

1. A battery box construction, comprising a box formed with a dovetail rib extending transversely across a wall thereof, and a handle formed with a dovetail channel portion force-fitted onto said rib by a transverse sliding action, said channel portion including upper and lower flanges, the upper flanges being of greater width than the lower flange, said handle being constructed to be applied on or removed from the box by a driving blow.

2. A battery box construction, comprising a box formed with a dovetail rib extending transversely across a wall thereof, and a handle formed with a dovetail channel portion force-fitted onto said rib by a transverse sliding action, said handle being constructed to be applied on or removed from the box by a driving blow.

3. A battery box construction comprising a box and a handle secured to the box, said box and said handle having interengaging transverse dovetail rib and transverse dovetail channel portions, whereby the handle is secured on the box by a transverse sliding force-fit, said handle being constructed to be applied on or removed from the box by a driving blow.

4. A handle for battery boxes, comprising a member so formed as to have a transverse sliding force fit on a transverse dovetail portion of a battery box, said member comprising a transverse dovetail channel piece, said handle being constructed to be applied on or removed from the box by a driving blow.

5. A handle for battery boxes, comprising a member so formed as to have a transverse sliding force fit on a transverse dovetail portion of a battery box, said member comprising a transverse channel piece, said handle being constructed to be applied on or removed from the box by a driving blow.

6. A handle for battery boxes, comprising a member so formed as to have a transverse sliding force fit on a transverse dovetail portion of a battery box, said handle being constructed to be applied on or removed from the box by a driving blow.

7. A battery box construction comprising a box and a handle of flexible sheet metal secured to the box, said box and said handle having interengaging transverse dovetail rib and transverse dovetail channel portions, whereby the handle is secured on the box by a transverse sliding force-fit, said handle being constructed to be applied on or removed from the box by a driving blow.

8. A battery box construction comprising a box and a handle secured to the box, said box and said handle having interengaging, transverse, dovetail rib and transverse, dovetail channel portions, at least one end of said rib and said channel being unobstructed, said handle being constructed to be applied on or removed from the box by a driving blow.

9. The combination of a battery box and a handle secured on the box, said handle having a sliding force-fit with a portion of the box, said handle being constructed to be applied on or removed from the box by a driving blow.

10. A battery box construction comprising a box and a handle secured to the box, said box and said handle having interengaging means thereon including a dovetail projection, and a dovetail channel, whereby the handle is secured on the box by a sliding force-fit of one in the other.

ELLIS H. BRIDGE.